US012789500B2

(12) United States Patent
Zheng et al.

(10) Patent No.: US 12,789,500 B2
(45) Date of Patent: Nov. 10, 2026

(54) HONEYCOMB CORE MATERIAL

(71) Applicant: Maanshan MAT Aviation Manufacturing Co., Ltd, Ma'anshan (CN)

(72) Inventors: You Zheng, Ma'anshan (CN); Qiaoying Zheng, Ma'anshan (CN)

(73) Assignee: Maanshan MAT Aviation Manufacturing Co., Ltd

( * ) Notice: Subject to any disclaimer, the term of this patent is extended or adjusted under 35 U.S.C. 154(b) by 156 days.

(21) Appl. No.: 18/291,548

(22) PCT Filed: Jan. 27, 2022

(86) PCT No.: PCT/CN2022/074343
§ 371 (c)(1),
(2) Date: Jan. 23, 2024

(87) PCT Pub. No.: WO2023/000644
PCT Pub. Date: Jan. 26, 2023

(65) Prior Publication Data

US 2025/0091314 A1 Mar. 20, 2025

(30) Foreign Application Priority Data

Jul. 23, 2021 (CN) ......................... 202110839826.7

(51) Int. Cl.
*B32B 3/12* (2006.01)
*B32B 3/26* (2006.01)
(Continued)

(52) U.S. Cl.
CPC ................ *B32B 3/28* (2013.01); *B32B 3/266* (2013.01); *B32B 7/05* (2019.01); *B32B 15/011* (2013.01)

(58) Field of Classification Search
None
See application file for complete search history.

(56) References Cited

U.S. PATENT DOCUMENTS 3,340,023 A * 9/1967 Hulsey .................... E04C 2/365 428/116
5,431,980 A * 7/1995 McCarthy ............. B31D 3/023 428/116

(Continued)

FOREIGN PATENT DOCUMENTS

CN 1224638 A 8/1999
CN 201906956 U 7/2011

(Continued)

OTHER PUBLICATIONS

Ito et al., machine translation of JP H06-7866, Jan. 18, 1994 (Year: 1994).*

(Continued)

*Primary Examiner* — Mary I Omori
(74) *Attorney, Agent, or Firm* — THE SUN IP LAW

(57) ABSTRACT

Provided is a honeycomb core material. The honeycomb core material is formed by welding a plurality of honeycomb corrugated bands, and includes a plurality of honeycomb elements. The honeycomb corrugated band includes free edges (1) and node edges (2) that are continuously arranged. The node edges that are correspondingly welded together form a honeycomb element node, and honeycomb element nodes are welded by laser or resistance spot welding. Welding spots of spot welding are uniformly distributed, a distance between two adjacent welding spots in a direction perpendicular to a cross section of the honeycomb element is d, a side length at the honeycomb element node is A, and a value of d is less than or equal to a value of A.

14 Claims, 11 Drawing Sheets

(51) Int. Cl.

| | |
|---|---|
| ***B32B 3/28*** | (2006.01) |
| ***B32B 7/05*** | (2019.01) |
| ***B32B 15/01*** | (2006.01) |

(56) References Cited

U.S. PATENT DOCUMENTS

| | | | | |
|---|---|---|---|---|
| 6,485,025 | B1 * | 11/2002 | Hammersley ...... | B23K 35/3046 415/174.4 |
| 2010/0015464 | A1 | 1/2010 | Moon | |
| 2014/0349082 | A1 * | 11/2014 | Tien .......................... | B32B 3/28 156/60 |
| 2020/0398519 | A1 | 12/2020 | Takahira et al. | |

FOREIGN PATENT DOCUMENTS

| | | | | | |
|---|---|---|---|---|---|
| CN | 201974090 | U | | 9/2011 | |
| CN | 104191114 | A | | 12/2014 | |
| CN | 203992876 | U | | 12/2014 | |
| CN | 108372393 | A | | 8/2018 | |
| CN | 109500546 | A | | 3/2019 | |
| CN | 109681762 | A | | 4/2019 | |
| CN | 109848558 | A | | 6/2019 | |
| CN | 111215854 | A | | 6/2020 | |
| CN | 112453760 | A | | 3/2021 | |
| CN | 113478083 | A | | 10/2021 | |
| GB | 1390968 | A | * | 4/1975 | ............... B32B 3/12 |
| JP | H067866 | A | * | 1/1994 | |
| JP | H06106357 | A | | 4/1994 | |
| JP | 2000289131 | A | | 10/2000 | |

OTHER PUBLICATIONS

Minamida et al., machine translation of JP 2000-289131, Oct. 17, 2000 (Year: 2000).*

The search report of counterpart EP application No. 22844818.9 issued on Jan. 9, 2025.

* cited by examiner

HONEYCOMB CORE MATERIAL

CROSS-REFERENCES TO RELATED APPLICATION

The present application is a National Stage of International Patent Application No: PCT/CN2022/074343 filed on 27 Jan. 2022, which claims the benefit of the priority of the Chinese patent application with the application No. CN202110839826.7, filed on 23 Jul. 2021, the entire content of which is incorporated in this application by reference.

PRIOR ART

The present disclosure relates to the field of design and manufacturing of a honeycomb structure, and in particular to a honeycomb core material.

BACKGROUND OF THE INVENTION

A honeycomb structure can absorb impact kinetic energy during compression due to collision to play a role of buffering and protection, and the honeycomb structure has a light weight and high strength. Therefore, the honeycomb structure is widely used in high specific strength fields such as impact energy absorption for protection, aerospace, and ships.

Currently, a main manufacturing process of an energy-absorbing honeycomb is adhesive bonding. In the prior art, a crush strength curve of a bonded aluminum honeycomb or paper honeycomb is stable. However, honeycombs are bonded through adhesive, and a material is aluminum or paper, where strength of the material and bonding strength are limited, and the adhesive fails in a high-temperature and high-pressure environment. Therefore, the aluminum honeycomb or paper honeycomb cannot be used in a special high-temperature and high-pressure scenario. At the same time, because the material of the aluminum honeycomb or paper honeycomb is limited, crush strength of a honeycomb structure formed by bonding aluminum honeycombs or paper honeycombs is limited.

In addition, currently, although a honeycomb may be manufactured through welded connection, a crush curve of the honeycomb is unstable, and specific strength is also inadequate. For example, a crush curve of an existing non-bonded welded metal honeycomb, especially a stainless steel honeycomb and a titanium alloy honeycomb, is in an irregular state, which cannot meet a requirement for energy absorption in a special scenario. For example, FIG. 1 shows a crush curve of a stainless steel honeycomb in the prior art, where a fluctuation of the crush curve is unstable, and cannot meet a requirement that a fluctuation of energy-absorbing crush strength is in a certain range.

SUMMARY OF THE INVENTION

A purpose of the present disclosure is to provide a honeycomb core material, to resolve a technical problem of structure design and manufacturing that a fluctuation of a crush curve of a metal honeycomb, especially a welded (non-bonded) metal honeycomb core material is large and unstable in the prior art.

To achieve the purpose, according to an aspect of the present disclosure, a honeycomb core material is provided. The honeycomb core material is formed by welding a plurality of honeycomb corrugated bands, and includes a plurality of honeycomb elements. The honeycomb corrugated band includes free edges and node edges that are continuously arranged. The node edges that are correspondingly welded together form a honeycomb element node, and honeycomb element nodes are welded by laser or resistance spot welding. Welding spots of spot welding are uniformly distributed, a distance between two adjacent welding spots in a direction perpendicular to a cross section of the honeycomb element is d, a side length at the honeycomb element node is A, and a value of d is less than or equal to a value of A.

Further, the node edge that forms the honeycomb element node is provided with a concave-convex strip in the direction perpendicular to the cross section.

Further, both the node edges that form the honeycomb element node are provided with concave-convex strips in the direction perpendicular to the cross section, and the concave-convex strip on one of the node edges fits with the concave-convex strip of the corresponding node edge welded together.

Further, one of the node edges that form the honeycomb element node is provided with a concave-convex strip in the direction perpendicular to the cross section, and the other corresponding node edge welded together is not provided with a concave-convex strip.

Further, there are two or more concave-convex strips on the honeycomb element node.

Further, the concave-convex strips are arranged on two edges of at least one honeycomb element node, the middle is a straight section, two edges are forward and reverse arc-shaped sections, and the welding spots are distributed in the middle of the straight section.

Further, the concave-convex strips are arranged on two edges of at least one honeycomb element node, the middle is a straight section, two edges are forward and reverse arc-shaped sections, and the welding spots are distributed on the forward and reverse arc-shaped sections of the two edges; or the welding spots are distributed on the forward and reverse arc-shaped sections of the two edges and in the middle of the straight section.

Further, the concave-convex strips are arranged on two edges of at least one honeycomb element node, the middle is a straight section, two edges are arc-shaped sections in a same direction, and the welding spots are distributed in the middle of the straight section.

Further, the concave-convex strips are arranged on two edges of at least one honeycomb element node, the middle is a straight section, two edges are arc-shaped sections in a same direction, and the welding spots are distributed on the arc-shaped sections in a same direction of the two edges; or the welding spots are distributed on the arc-shaped sections in a same direction of the two edges and in the middle of the straight section.

Further, a material of the honeycomb core material is metal, and the metal includes non-ferrous metal and ferrous metal. The non-ferrous metal includes a titanium alloy, aluminum or a magnesium alloy. The ferrous metal includes carbon steel, stainless steel or a superalloy.

Further, a welding manner in which a hole is formed in the middle of the welding spot, and a molten core is formed around welding spot is used during spot welding, or a fluctuation of a honeycomb crush curve and specific strength of the honeycomb core material are further controlled and adjusted by forming an opening on the honeycomb corrugated band in advance in a stamping or rolling or cutting manner.

According to the technical solutions of the present disclosure, the honeycomb element node is fixed through laser or resistance spot welding, the welding spots of the spot welding for fixation are uniformly distributed, the distance between two adjacent welding spots in the direction perpendicular to the cross section of the honeycomb element is d, and the value of d is set to be less than or equal to the value of the side length A at the honeycomb element node. In this way, it is ensured that there is support of at least one welding spot within progressive shrinkage deformation during compression of honeycomb cells, so that cracking and distortion do not occur even in the smallest unit inside the honeycomb core material during the compression, instability does not occur in the smallest unit during honeycomb compression, and thus instability does not occur in the honeycomb core material, thereby ensuring high stability of a crush strength curve of the honeycomb core material. The concave-convex strip is disposed on the honeycomb element node, so that the crush strength of the honeycomb core material can be increased and adjusted, the fluctuation of the crush curve can be further reduced, and the specific strength of the honeycomb core material can be maximized.

BRIEF DESCRIPTION OF DRAWINGS

The accompanying drawings constituting a part of the present application are used for providing further understanding of the present disclosure. Schematic embodiments of the present disclosure and description thereof are used for illustrating the present disclosure and not intended to form an improper limit to the present disclosure. In the accompanying drawings:

FIG. 3*a*-1 is a schematic diagram of a structure and staggered distribution of welding spots of a honeycomb core material according to an embodiment of the present disclosure;

FIG. 6*a*-1 is a schematic diagram of a structure and other distribution of welding spots of a honeycomb core material according to the present disclosure;

FIG. 8*a*-1 is a schematic diagram of a structure and other distribution of welding spots of yet another honeycomb core material according to the present disclosure;

DETAILED DESCRIPTION OF THE INVENTION

It is to be noted that the embodiments in the present application and characteristics in the embodiments may be combined without conflicts. The present disclosure is elaborated below with reference to the accompanying drawings and embodiments.

Figure 2:
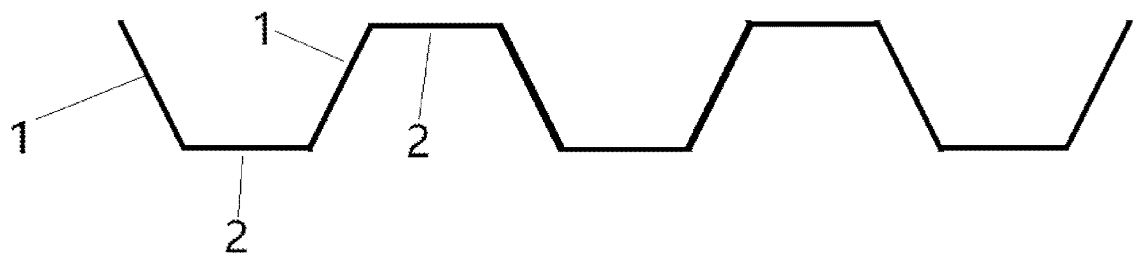
FIG. 2 is a structure diagram of a honeycomb corrugated band, where 1 is a free edge, and 2 is a node edge.

As shown in FIG. 2, a honeycomb corrugated band includes free edges and node edges that are continuously arranged. The node edges of two honeycomb corrugated bands overlap to form a honeycomb element. A plurality of honeycomb elements form a honeycomb structure.

According to a typical implementation mode of the present disclosure, a honeycomb core material is provided. The honeycomb core material is formed by welding a plurality of honeycomb corrugated bands, and includes a plurality of honeycomb elements. The honeycomb corrugated band includes free edges and node edges that are continuously arranged. The node edges that are correspondingly welded together form a honeycomb element node, and honeycomb element nodes are welded by laser or resistance spot welding. Welding spots of spot welding are uniformly distributed, a distance between two adjacent welding spots in a direction perpendicular to a cross section of the honeycomb element is d, a side length at the honeycomb element node is A, and a value of d is less than or equal to a value of A.

It is to be noted that, in a typical implementation mode of the present disclosure, the honeycomb element is a regular hexagon, and the side length A at the honeycomb element node of the honeycomb element is equal to that of other sides of the honeycomb element, the value of A is equal to a side length of a cell, and the value of d is less than or equal to a value of the side length at the cell. If the honeycomb element is not a regular hexagon, the value of d is less than or equal to a side length at a joint of the welding spots, that is, the side length A at the honeycomb element node of the honeycomb element.

According to the technical solutions of the present disclosure, the honeycomb element node is fixed through laser or resistance spot welding, the welding spots of the spot welding for fixation are uniformly distributed, the distance between two adjacent welding spots in the direction perpendicular to the cross section of the honeycomb element is d, and the value of d is set to be less than or equal to the value of the side length A at the honeycomb element node. In this way, it is ensured that there is support of at least one welding spot within progressive shrinkage deformation during compression of honeycomb cells, so that cracking and distortion do not occur even in the smallest unit inside the honeycomb core material during the compression, instability does not occur in the smallest unit during honeycomb compression, and thus instability does not occur in the honeycomb core material, thereby ensuring high stability of a crush strength curve of the honeycomb core material.

Figure 1:
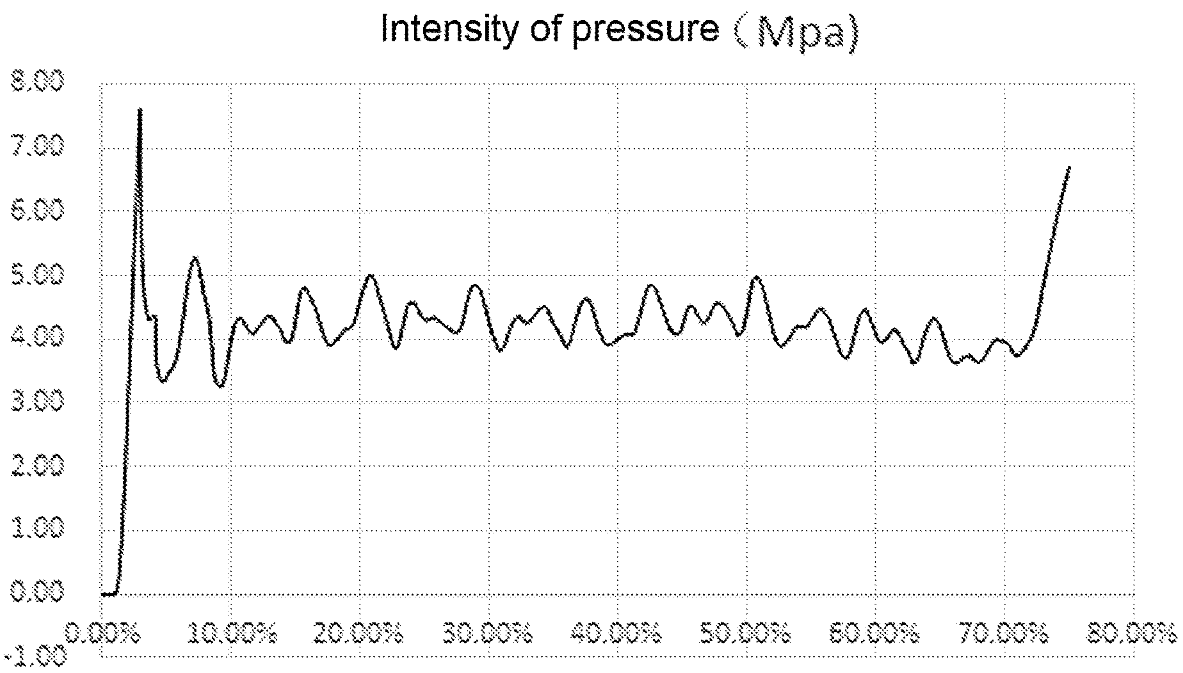
FIG. 1 is a crush curve of a stainless steel honeycomb in the prior art.
Figure 3A:
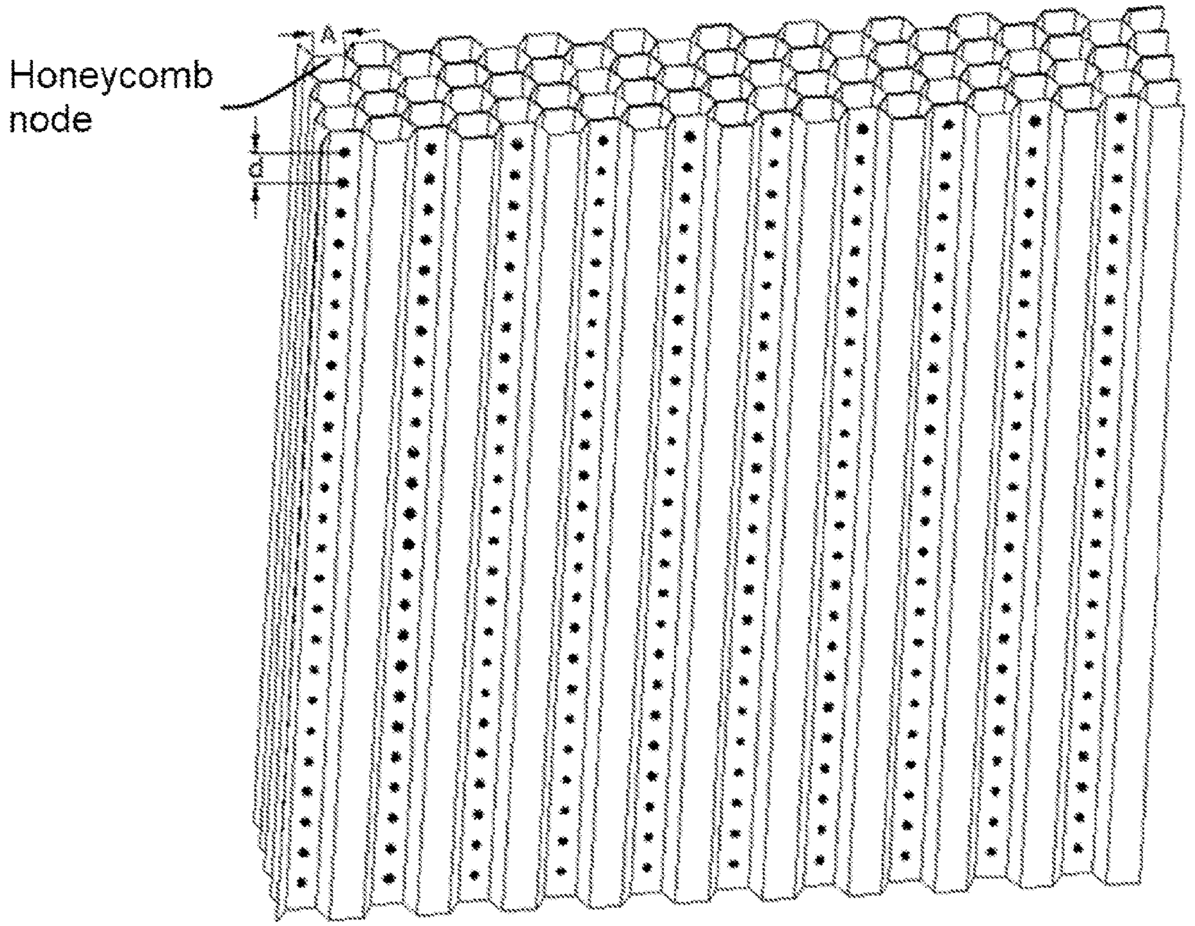
FIG. 3*a* is a schematic diagram of a structure and distribution of welding spots of a honeycomb core material according to an embodiment of the present disclosure.
Figures 1, 3A:
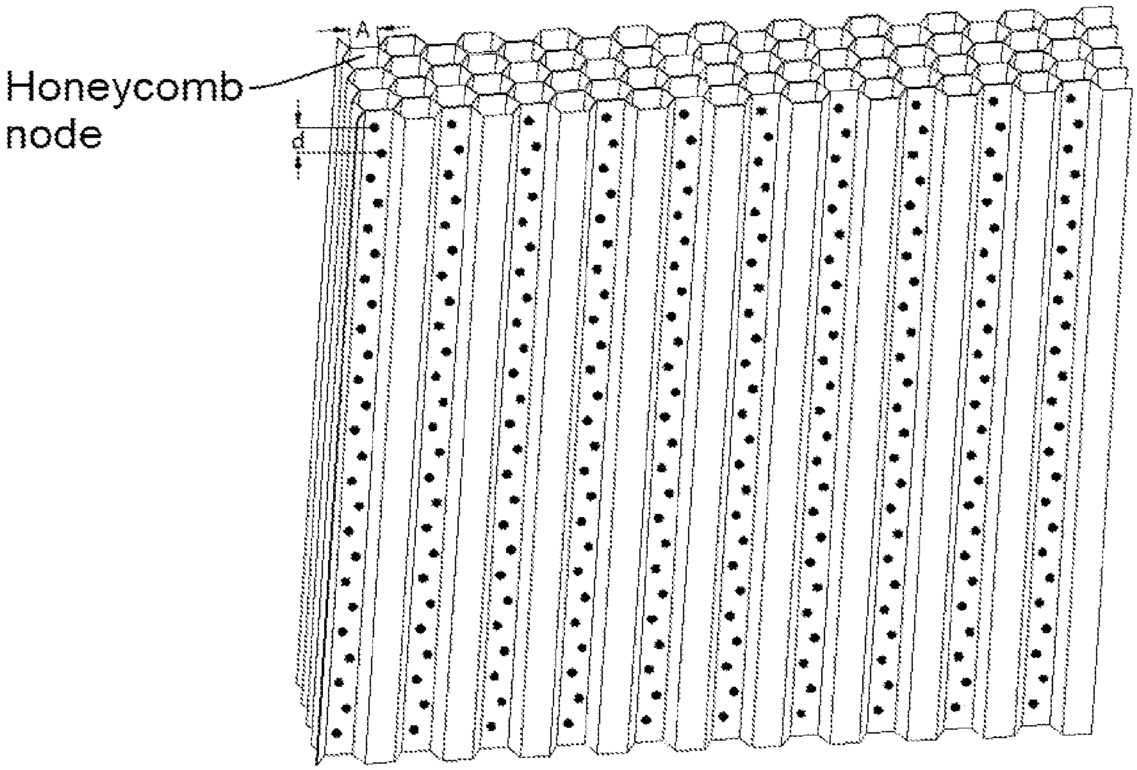
Figure 3B:
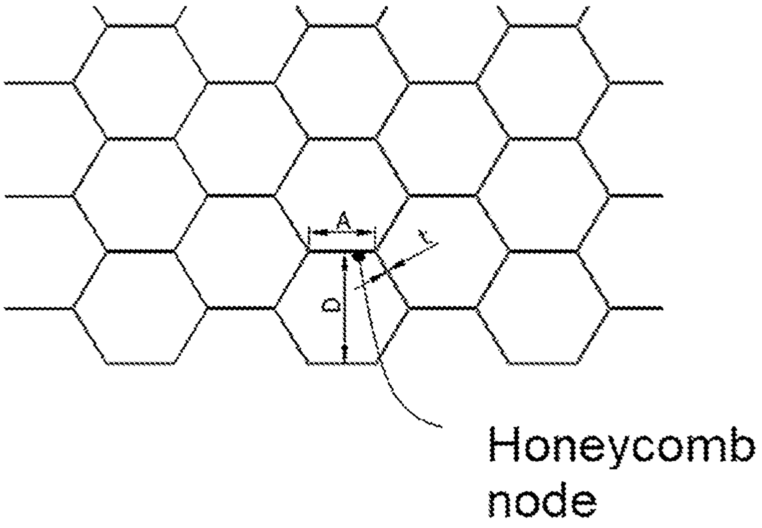
FIG. 3*b* is a structure diagram of a cross section of the honeycomb core material shown in FIG. 3*a;*

In addition, highly stable crush resistance of welded honeycombs of the present disclosure does not fail even under a high-temperature and high-pressure condition. FIG. 3*a* is a schematic diagram of a structure and distribution of welding spots of a honeycomb core material according to an embodiment of the present disclosure. FIG. 3*a*-1 is a schematic diagram of a structure and staggered distribution of welding spots of a honeycomb core material according to an embodiment of the present disclosure. The welding spots are not distributed in a straight line (in this case, the distance d between two adjacent welding spots is a distance between planes that the welding spots are located on and that are parallel to the cross section of the honeycomb core material), and are distributed in a staggered manner (FIG. 3*b* is a structure diagram of a cross section of the honeycomb core material shown in FIG. 3*a*, where A represents the side length at a node of the regular hexagonal honeycomb element, D represents a distance between opposite sides of a regular hexagonal honeycomb cell, and t represents a thickness of a core material forming the honeycomb cell). High stability of a crush strength curve of a welded metal honeycomb designed and manufactured according to a method of the present disclosure is ensured and maintained in a certain range, that is, highly stable crush strength of the welded metal honeycomb can be controlled by changing a thickness of the honeycomb corrugated band and a size of the honeycomb cell. Therefore, the honeycomb core material of the present application can meet a requirement that a fluctuation of honeycomb crush strength is in a certain range and a requirement for high specific strength in a special environment in the fields such as aerospace and nuclear energy. In addition, a manufacturing method of the present disclosure adopts a laser or resistance spot welding manufacturing process, which has high manufacturing efficiency and greatly improves production efficiency. Lot manufacturing can be achieved, and a single product can be customized and manufactured according to special requirements.

According to a preferred implementation mode of the present disclosure, at least one honeycomb element node of the honeycomb element is provided with a concave-convex strip in the direction perpendicular to the cross section, that is, the node edge is provided with a concave-convex strip in the direction perpendicular to the cross section, and the concave-convex strip fits with the concave-convex strip of a corresponding honeycomb corrugated band node welded together. Compared with a common hexagonal honeycomb, an overlapping joint of the honeycomb structure of the present disclosure is added with the concave-convex strip, therefore, strength of the honeycomb structure is further increased due to support of an arc-shaped section, density is almost the same as that of the common hexagonal honeycomb under a same condition, but structural strength is greatly increased. In another implementation mode of the present disclosure, one of the node edges that form the honeycomb element node is provided with a concave-convex strip in the direction perpendicular to the cross section, and the other corresponding node edge welded together is not provided with a concave-convex strip.

In an implementation mode of the present disclosure, the honeycomb is in a hexagonal shape formed by superimposing layer upon layer the honeycomb corrugated bands provided with concave-convex strips, a convex edge of a node edge on a front honeycomb corrugated band corresponds to a concave edge of a node edge on a back honeycomb corrugated band, and laser or resistance spot welding is adopted for fixation at each superposed position (that is, a node) of the honeycomb corrugated band to form a stable hexagonal honeycomb core. Welding spots in the adopted spot welding process need to be uniformly distributed.

Figure 5:
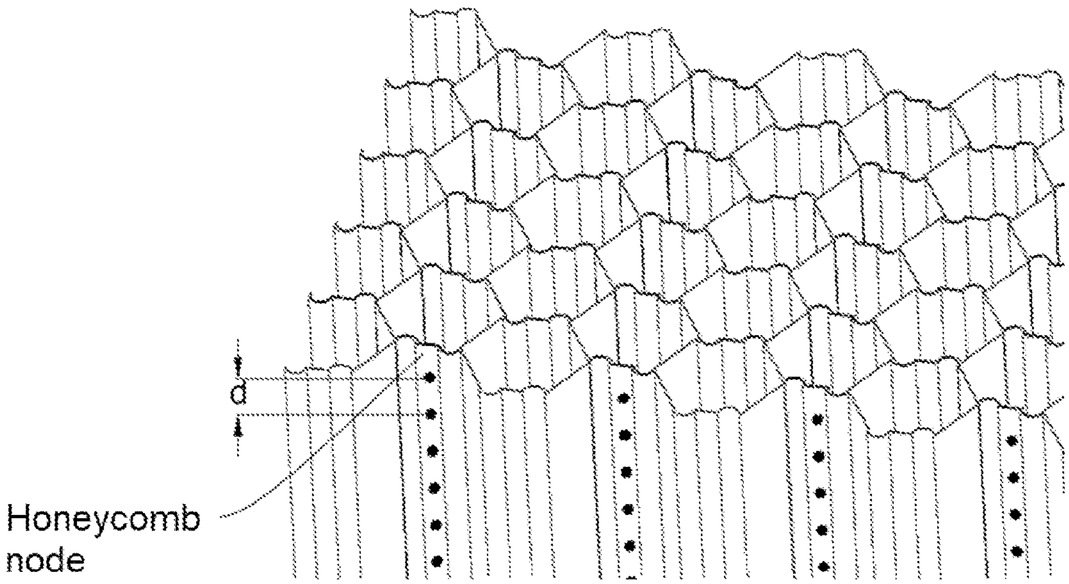
FIG. 5 is a schematic diagram of a structure and distribution of welding spots of a honeycomb core material according to the present disclosure.
Figure 6A:
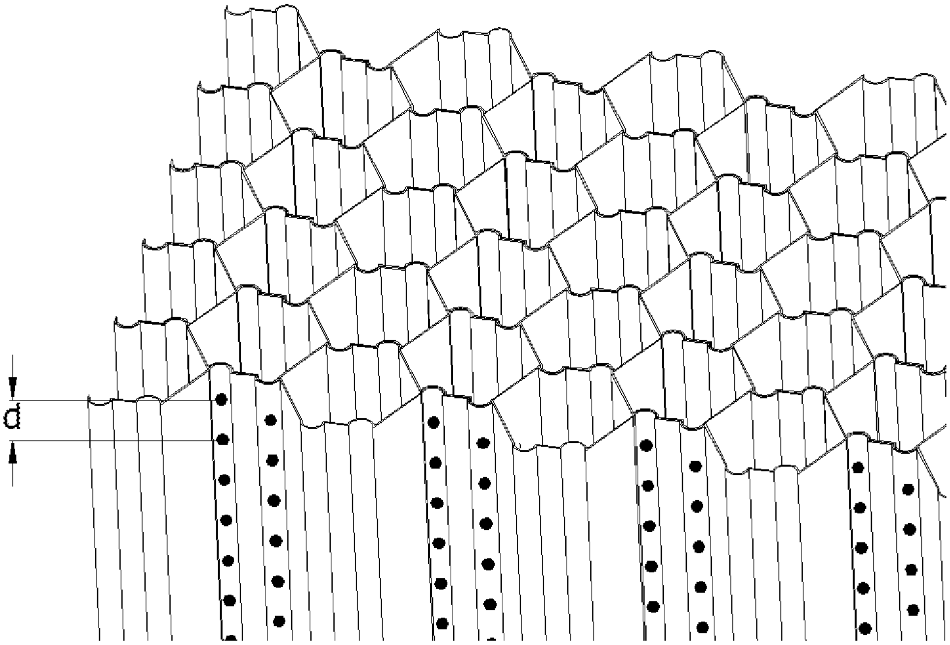
FIG. 6*a* is a schematic diagram of a structure and distribution of welding spots of another honeycomb core material according to the present disclosure.
Figures 1, 6A:
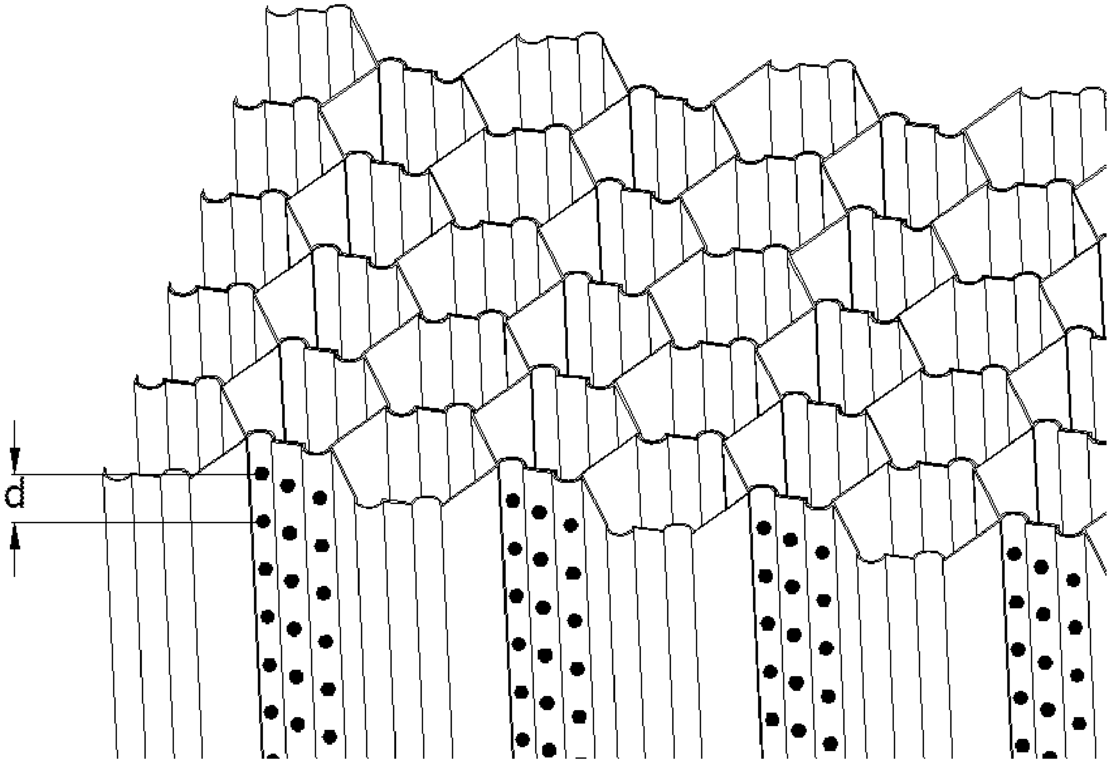
Figure 6B:
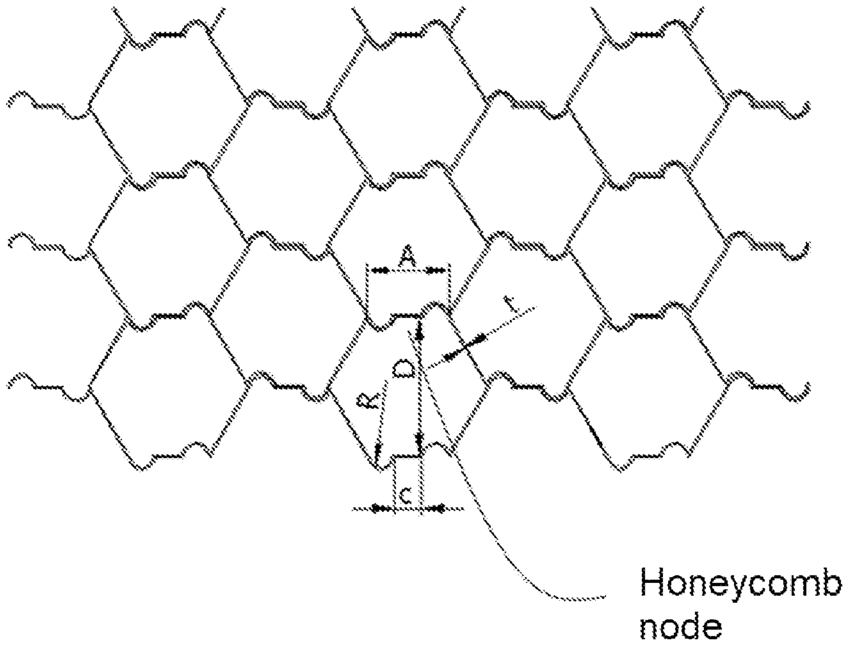
FIG. 6*b* is a structure diagram of a cross section of the honeycomb core material shown in FIG. 6*a;*
Figure 7A:
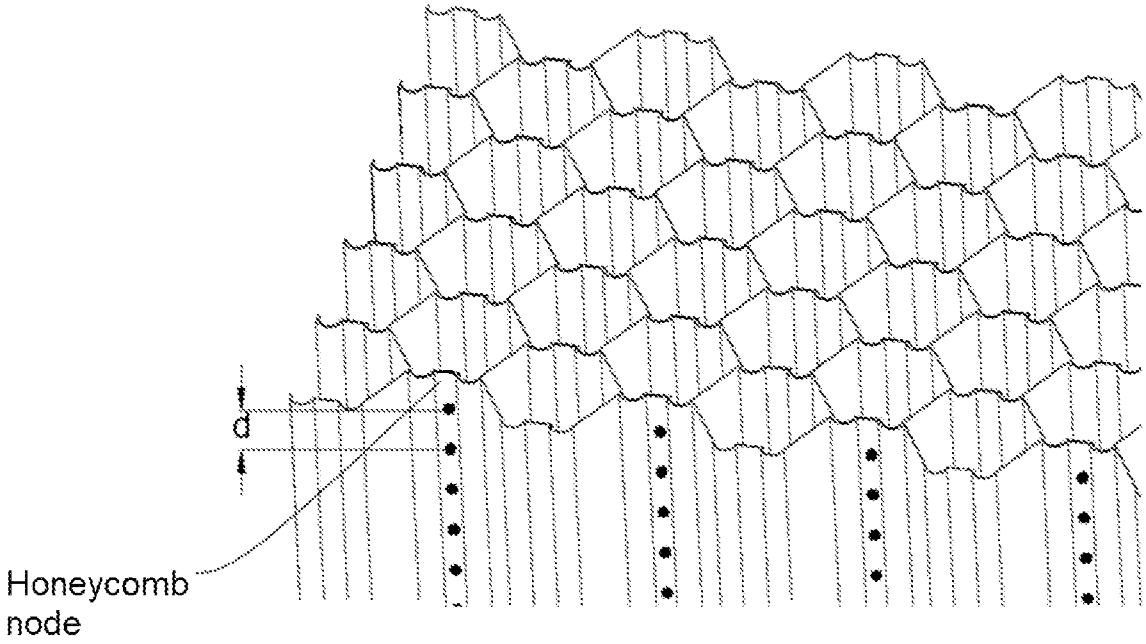
FIG. 7*a* is a schematic diagram of a structure and distribution of welding spots of still another honeycomb core material according to the present disclosure.
Figure 7B:
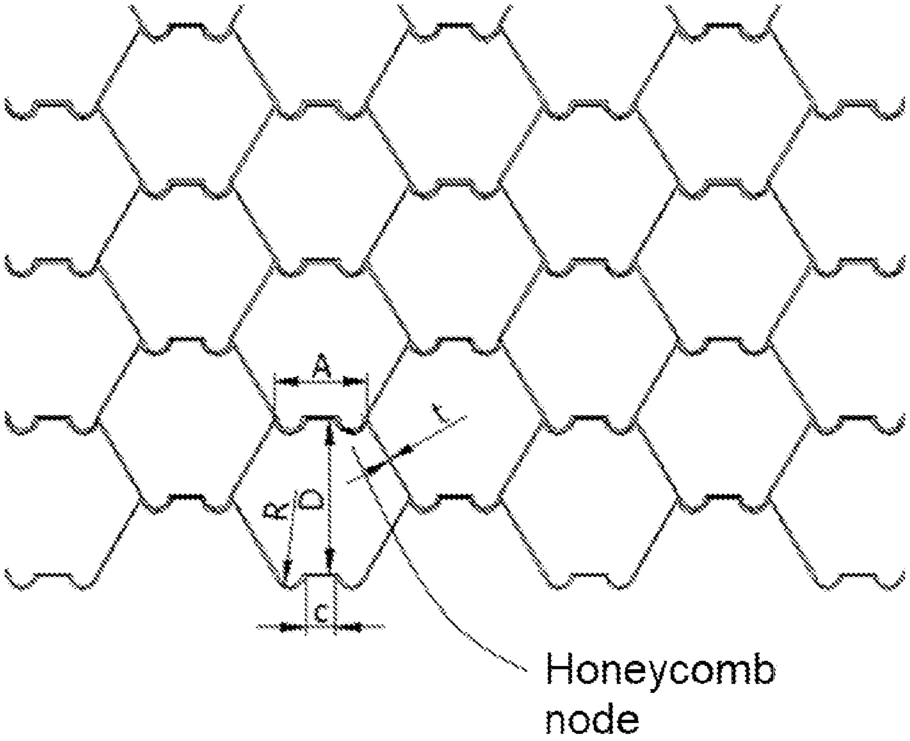
FIG. 7*b* is a structure diagram of a cross section of the honeycomb core material shown in FIG. 7*a;*
Figure 8A:
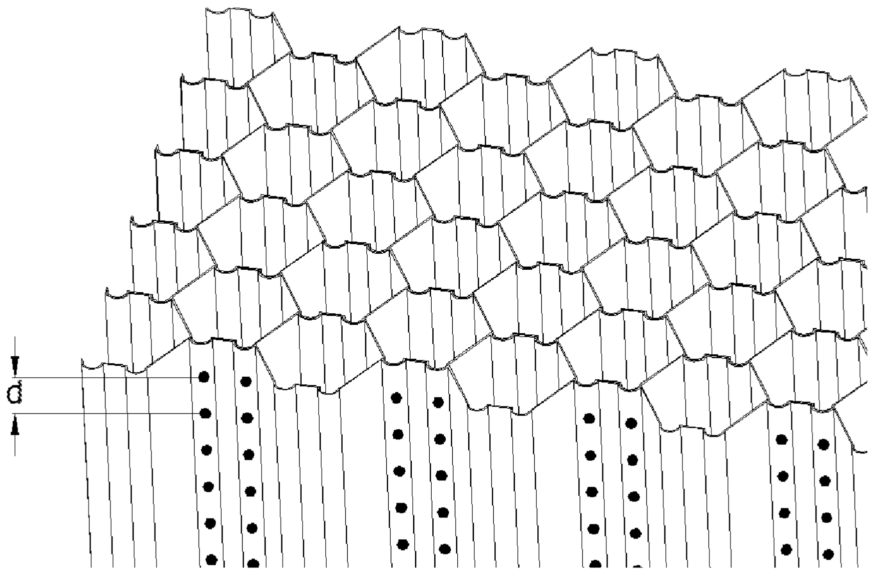
FIG. 8*a* is a schematic diagram of a structure and distribution of welding spots of yet another honeycomb core material according to the present disclosure.
Figures 1, 8A:
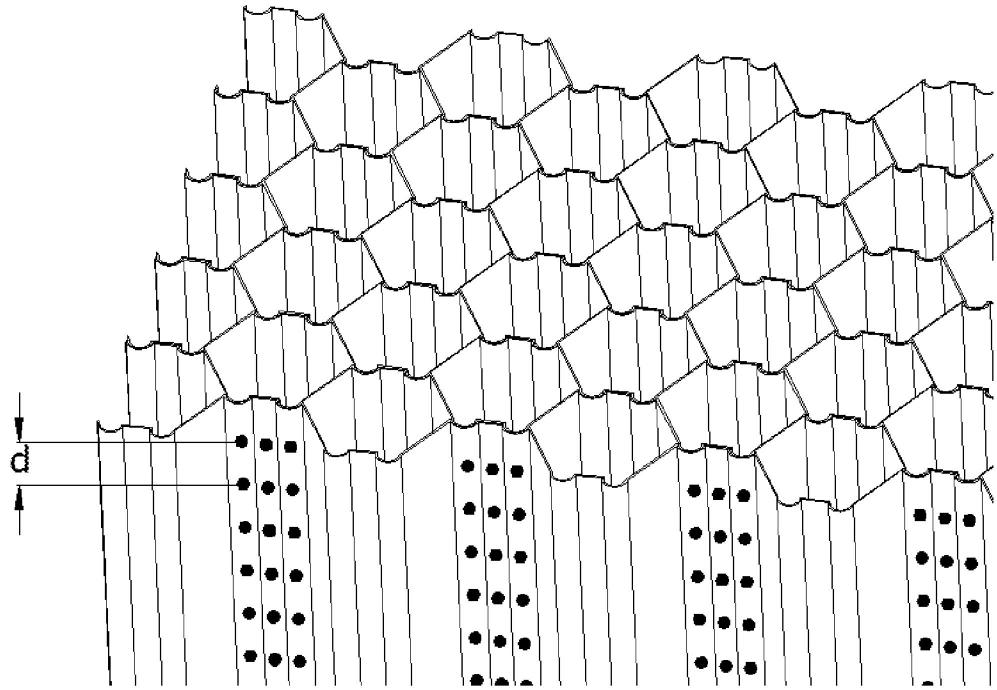
Figure 8B:
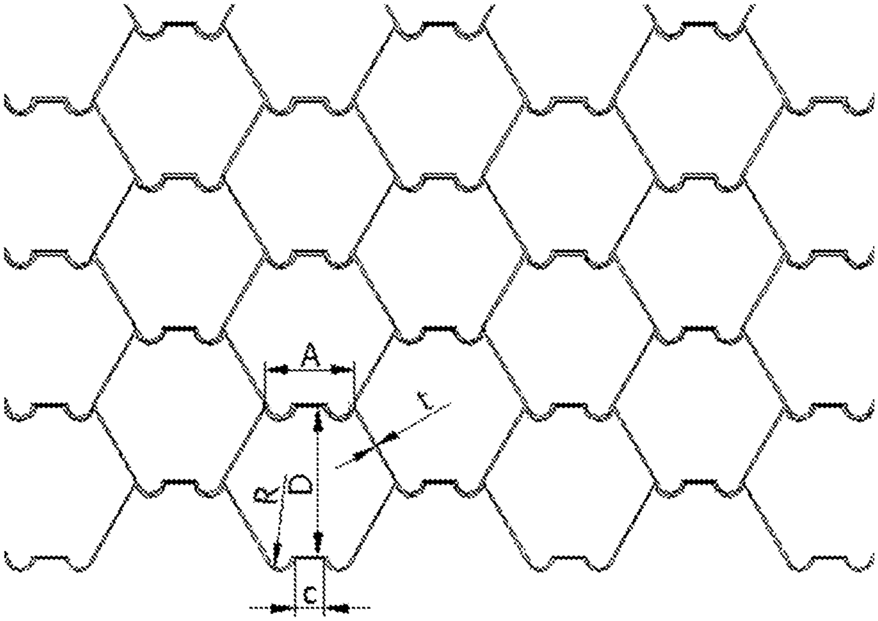
FIG. 8*b* is a structure diagram of a cross section of the honeycomb core material shown in FIG. 8*a;*

Typically, as shown in FIG. 5, the concave-convex strips are arranged on two edges of at least one honeycomb element node of the honeycomb element, the middle is a straight section, two edges are forward and reverse arc-shaped sections, and the welding spots are distributed in the middle of the straight section. As shown in FIG. 6*a*, the concave-convex strips may be arranged on two edges of at least one honeycomb element node of the honeycomb element, the middle is a straight section, two edges are forward and reverse arc-shaped sections, and the welding spots are distributed on the forward and reverse arc-shaped sections of the two edges (FIG. 6*b* is a structure diagram of a cross section of the honeycomb core material shown in FIG. 6*a*, where A represents the side length at the honeycomb element node, D represents the distance between the opposite sides of the regular hexagonal honeycomb cell, r represents the radius of the arc-shaped section, t represents the thickness of the core material forming the honeycomb cell, and c represents a middle straight section of a special honeycomb). As shown in FIG. 6*a*-1, the concave-convex strips may be arranged on two edges of at least one honeycomb element node of the honeycomb element, the middle is a straight section, two edges are forward and reverse arc-shaped sections, and the welding spots are distributed on the forward and reverse arc-shaped sections of the two edges and the straight section. As shown in FIG. 7*a*, the concave-convex strips are arranged on two edges of at least one honeycomb element node of the honeycomb element, the middle is a straight section, two edges are arc-shaped sections in a same direction, and the welding spots are distributed in the middle of the straight section (FIG. 7*b* is a structure diagram of a cross section of the honeycomb core material shown in FIG. 7*a*, where A represents the side length at the honeycomb element node, D represents the distance between the opposite sides of the regular hexagonal honeycomb cell, r represents the radius of the arc-shaped section, t represents the thickness of the core material forming the honeycomb cell, and c represents the middle straight section of the special honeycomb). As shown in FIG. 8*a*, the concave-convex strips may be arranged on two edges of at least one honeycomb element node of the honeycomb element, the middle is a straight section, two edges are arc-shaped sections in a same direction, and the welding spots are distributed on the arc-shaped sections in a same direction of the two edges (FIG. 8*b* is a structure diagram of a cross section of the honeycomb core material shown in FIG. 8*a*, where A represents the side length at the honeycomb element node, D represents the distance between the opposite sides of the regular hexagonal honeycomb cell, r represents the radius of the arc-shaped section, t represents the thickness of the core material forming the honeycomb cell, and c represents the middle straight section of the special honeycomb). As shown in FIG. 8*a*-1, the concave-convex strips may be arranged on two edges of at least one honeycomb element node of the honeycomb element, the middle is a straight section, two edges are arc-shaped sections in a same direction, and the welding spots are distributed on the arc-shaped sections in a same direction of the two edges and the straight section.

Figure 9A:
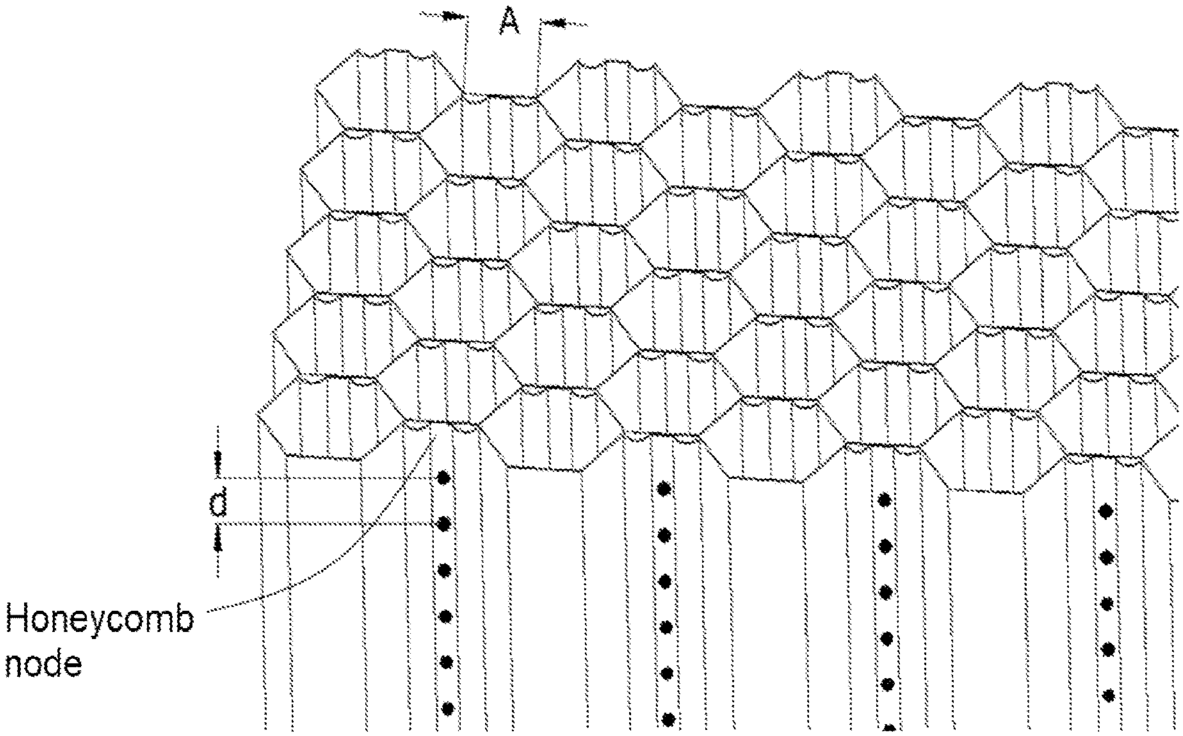
FIG. 9*a* shows a structure and distribution of welding spots on a node edge of yet another honeycomb core material according to the present disclosure.
Figure 9B:
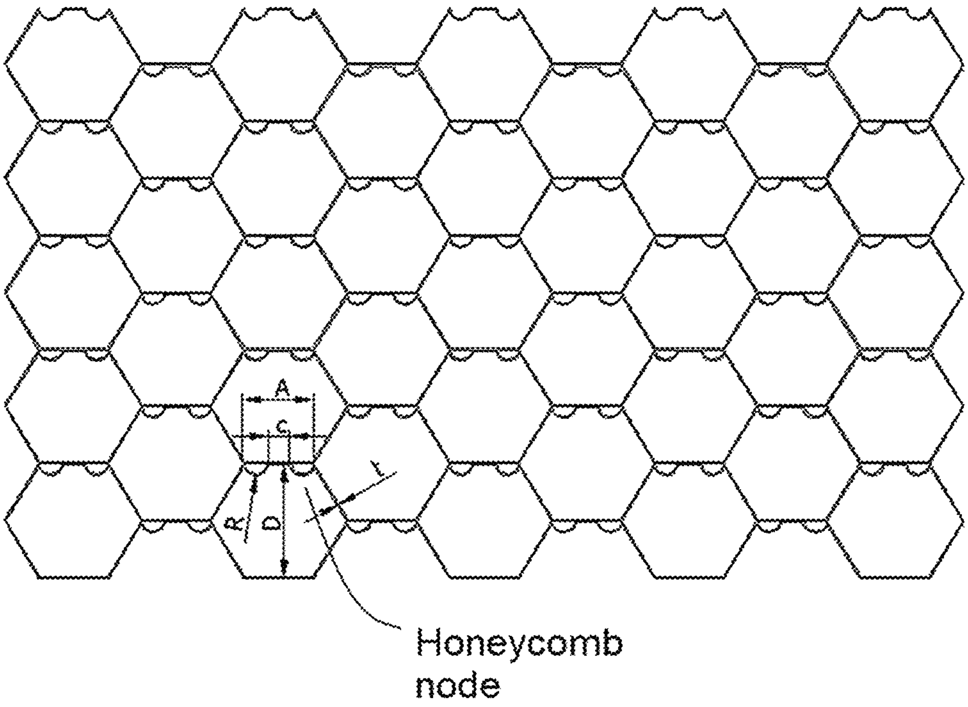
FIG. 9*b* is a structure diagram of a cross section of the honeycomb core material shown in FIG. 9*a;*

As shown in FIG. 9*a*, the concave-convex strips may be arranged on one edge of at least one honeycomb element node of the honeycomb element, the middle is a straight section, at least one edge is arc-shaped sections in a same direction, and the welding spots are distributed on the middle straight section (FIG. 9*b* is a structure diagram of a cross section of the honeycomb core material shown in FIG. 9*a*, where A represents the side length at the honeycomb element node, D represents the distance between the opposite sides of the regular hexagonal honeycomb cell, r represents the radius of the arc-shaped section, t represents the thickness of the core material forming the honeycomb cell, and c represents the middle straight section of the special honeycomb).

The honeycomb crush strength and a fluctuation of a honeycomb crush strength curve may be fine tuned through a change of the value of d between the welding spots and uniform distribution of the welding spots. To be specific, a smaller value of d indicates a smaller fluctuation of crush strength. In honeycomb core materials, the crush strength of a honeycomb with three columns of welding spots is larger than that of a honeycomb with two columns of welding spots, and the crush strength of a honeycomb with two columns of welding spots is larger than that of a honeycomb with a single column of welding spots.

In a single implementation mode of the present disclosure, a welding manner in which a hole is formed in the middle of the welding spot, and a molten core is formed around is used during spot welding, and the welding spots are distributed on the honeycomb element node uniformly or according to specific distribution, to achieve more adjustment of a design of the honeycomb crush curve; or a fluctuation of the honeycomb crush curve is further guided by forming an opening on the free edge of the honeycomb corrugated band in advance in a stamping or rolling manner. A quantity, size and position of openings may be designed and determined according to requirements of different crush curves through different opening designs.

It can be seen from above description that the structure of the special honeycomb of the present disclosure enables the honeycomb to have significantly high compression strength, and the distribution of the welding spots can adjust the honeycomb compression strength and the fluctuation of the honeycomb crush curve when the honeycombs are welded.

In the above distribution of the welding spots, the value of d is set to be less than or equal to the value of the side length A at the honeycomb element node, and the side length A at the honeycomb element node is a side length of the honeycomb cell at a joint of the welding spots between the honeycomb corrugated bands. For the honeycomb structures shown in FIG. 5, FIG. 6*a*, FIG. 6*a*-1, FIG. 7*a*, FIG. 8*a*, FIG. 8*a*-1 and FIG. 9*a*, the value of d is also set to be less than or equal to the value of the side length A at the honeycomb element node shown in the figures, that is, a distance A between endpoints of adjacent sides at the joint of the welding spots.

The distribution of the welding spots and the values described above are the most preferred options in examples of this patent, but this patent is not limited to this. It is to be noted that, for a general scenario in which a design that a fluctuation of a compression strength curve of a metal honeycomb core is not large is satisfied, beneficial effects of the present application are significant. In this case, the value of d is larger than the side length A at the honeycomb element node. The larger value of d indicates the larger fluctuation of the compression strength curve of the honeycomb core material, until compression fails and has no practical significance.

Further, openings are formed on a honeycomb band in a stamping or rolling manner before a honeycomb is formed, where a quantity, size and position of the openings may be determined according to design requirements of different crush curves. After a honeycomb material is opened and welded into a honeycomb core, the honeycomb may be compressed and deformed regularly according to the position of the opening. The openings may be distributed, through different designs, on a honeycomb wall uniformly or according to a specific distribution rule, to achieve a purpose of fine turning the design of the honeycomb compression curve. For example, in the honeycomb, the crush strength of three columns of welding spots is larger than that of two columns of welding spots, and the crush strength of two columns of welding spots is larger than that of a single column of welding spots, that is, with an increase of the welding spots of the honeycomb arranged in a horizontal direction, the compression strength curve of the honeycomb becomes more stable, the fluctuation becomes smaller, and design controllability is better.

The beneficial effects of the present disclosure are further described below with reference to embodiments.

Embodiment 1

A size of a honeycomb core for a crush test is 100 mm (length)×100 mm (width)×100 mm (height), a material is 304 stainless steel, a thickness is 0.13 mm, D of a cell is 6.4 mm, a side length A at a honeycomb element node is 3.70 mm, a distance d between adjacent welding spots is set to 2 mm, and honeycomb corrugated bands provided with concave-convex strips are superimposed layer upon layer to form a hexagonal honeycomb core.

Figure 4:
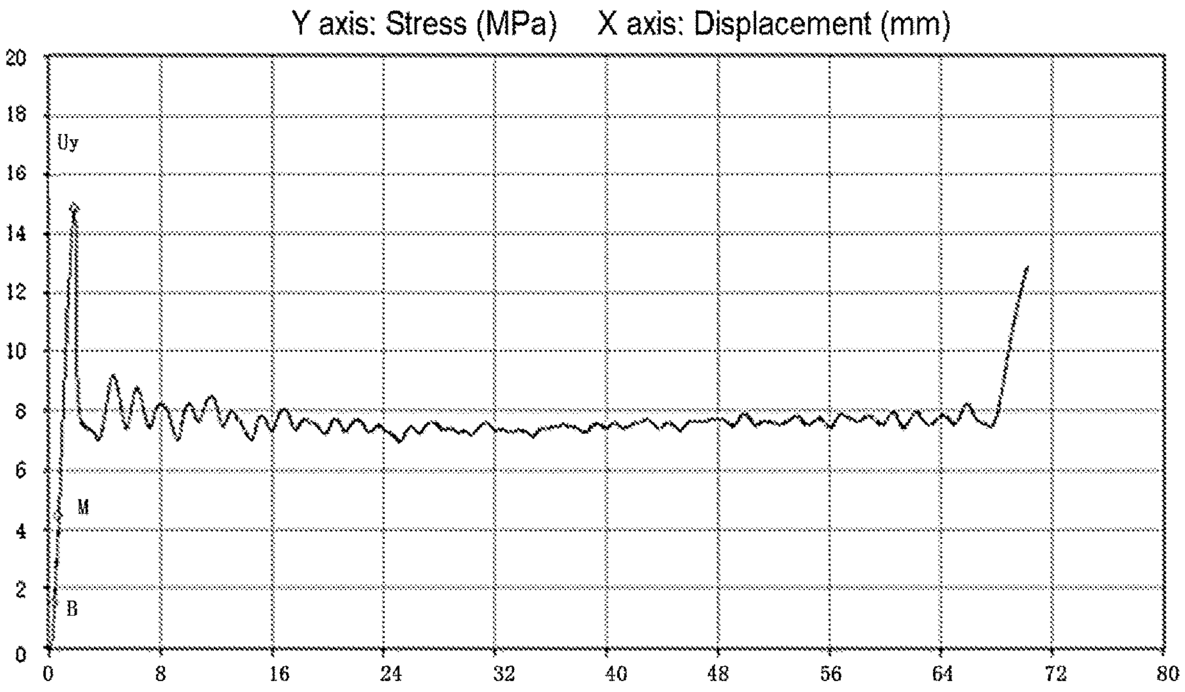
FIG. 4 is a crush curve of a stainless steel honeycomb in Embodiment 1.

According to a honeycomb formed by a method of the present disclosure, the d between adjacent welding spots is less than or equal to the side length A at the honeycomb element node. In this way, it is ensured that there is support of at least one welding spot within progressive shrinkage deformation during compression of honeycomb cells, so that cracking and distortion do not occur even in the smallest unit inside the honeycomb core material during the compression, the overall welding strength is large, and the welding spots are uniformly distributed, therefore, a crush curve of the honeycomb is particularly stable. Repeated tests prove that the overall welding strength of the honeycomb formed by using laser or resistance spot welding is larger than ultimate crush strength during honeycomb compression, therefore, compressive collapse and distortion do not occur inside the honeycomb. A honeycomb crush curve is shown in FIG. 4. In the crush test, an electronic universal testing machine DNS-300 is used for a compression test, and a compression test rate is 5 mm/s.

Embodiment 2

A size of a honeycomb core for a crush test is 100 mm (length)×100 mm (width)×100 mm (height), a material is 304 stainless steel, a thickness is 0.13 mm, D of a cell is 5.6 mm, a side length A at a honeycomb element node is 3.23 mm, and a distance d between adjacent welding spots is set to 2 mm.

Figure 10:
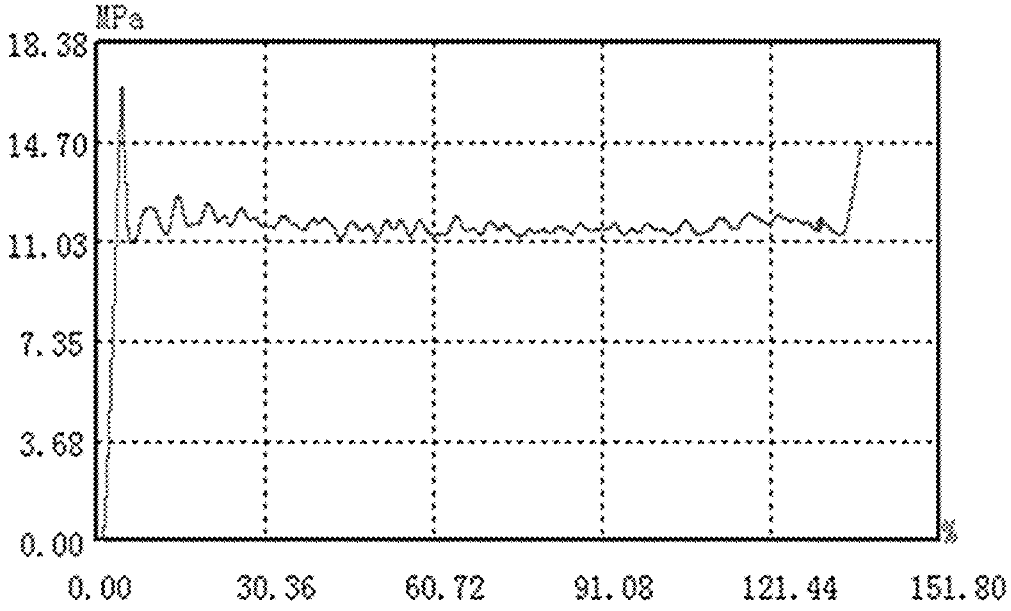
FIG. 10 is a crush curve of a stainless steel honeycomb in Embodiment 2.

An electronic universal testing machine DNS-300 is used for a compression test, and a compression test rate is 5 mm/s. Repeated tests prove that a manufacturing method of the present disclosure is stable and feasible. A crush strength curve is stable, as shown by a tested compression strength curve in FIG. 10.

Embodiment 3

Figure 11:
FIG. 11 shows a crush curve of a stainless steel honeycomb of a honeycomb core material 1 in Embodiment 3.
Figure 12:
FIG. 12 shows a crush curve of a stainless steel honeycomb of a honeycomb core material 2 in Embodiment 3.

An electronic universal testing machine DNS-300 is used for a compression test, and a compression test rate is 5 mm/s. The following test data is obtained through the test: Table 1, a compression strength curve is shown in FIG. 11 and FIG. 12.

TABLE 1

Crush strength test data at different heights of stainless steel honeycombs

| | | Minimum intensity of pressure | | Maximum intensity of pressure | |
|---|---|---|---|---|---|
| Sample information | Average intensity of pressure (MPa) | Value of intensity of pressure (MPa) | Floating ratio | Value of intensity of pressure (MPa) | Floating ratio |
| Material: 304 stainless steel; D of a honeycomb cell: 5.9; thickness of a honeycomb corrugated band: 0.13 mm; height: 57 mm (a honeycomb core material 1); A is 3.406 mm; and d is set to 2 mm | 10.63 | 10.04 | −7.1% | 11.56 | 7% |
| | 10.34 | 9.83 | −9% | 11.11 | 2.8% |
| Material: 304 stainless steel; D of a honeycomb cell: 5.9; thickness of a honeycomb corrugated band: 0.13 mm; height: 57 mm (a honeycomb core material 1); A is 3.406 mm; and d is set to 2 mm. | 10.63 | 10.1 | −6.5% | 11.7 | 8.3% |
| | 10.64 | 9.7 | −10.1% | 11.88 | 10% |

Embodiment 4

A honeycomb cell is 6.4 mm, a thickness of a honeycomb band is 0.1 mm, a height of a honeycomb is 32 mm, a honeycomb material is 304 stainless steel, a side length A at a honeycomb element node is 3.695 mm, and a distance d between adjacent welding spots is set to 2 mm. In a crush test, an electronic universal testing machine DNS-300 is used for a compression test, and a compression rate is 5 mm/s.

TABLE 2

Comparison of test results of honeycomb crush strength of several core materials with different honeycomb structures in the present disclosure

| Sample number | Honeycomb specification | Average intensity of pressure (MPa) | Comparison of crush strength of different honeycomb structures in the present disclosure |
|---|---|---|---|
| A-A conventional honeycomb of the present disclosure (referring to FIG. 3a and FIG. 3b) | Material: 304 stainless steel; D of a cell: 6.4; specification: 0.1 mm × 32 mm (0.1 mm-a thickness of a honeycomb band, and 32 mm-a height of the honeycomb); the side length A at the honeycomb element node is 3.695 mm, and the distance d between the adjacent welding spots is set to 2 mm. | 4.8 | Basic structure A |
| B1-A honeycomb structure of the present disclosure (a single column of welding spots, referring to FIG. 7a and FIG. 7b) | | 6.43 | ≥34% (B1 vs A) |
| B2-A honeycomb structure of the present disclosure (two columns of welding spots, referring to FIG. 8a and FIG. 8b) | | 7.63 | ≥59% (B2 vs A) |

It can be seen from above description that the above embodiments of the present disclosure achieve the following technical effects: the crush strength can be adjusted by changing the thickness of the material and the size of the honeycomb cell; the optimum specific strength (honeycomb strength/honeycomb density) of the honeycomb structure can be obtained by designing a shape and honeycomb structure of the honeycomb); and the maximum and minimum fluctuation ranges of the crush strength can be controlled by designing distribution of welding spots of the honeycomb structure according to the corresponding honeycomb structure.

It can be seen from above description that the structure of the special honeycomb of the present disclosure enables the honeycomb to have significantly high crush strength, and the distribution of the welding spots can adjust the honeycomb compression strength and control the fluctuation range of the honeycomb compression curve when the honeycombs are welded.

In the distribution of the welding spots, that d is less than or equal to A is the most preferred options in the embodiments of the present application, and the present application is not limited to this. It is to be noted that, for a general scenario in which a design that a fluctuation of a compression strength curve of a metal honeycomb core is not large is satisfied, beneficial effects of the present application are significant. In this case, the value of d is greater than the side length A at the honeycomb element node, and the value of d directly affects the fluctuation of the compression strength curve. To be specific, the larger value of d indicates the larger fluctuation of the compression strength curve of the honeycomb core material, until compression fails and has no practical significance.

It can be seen from above description that the honeycomb crush strength and the fluctuation of the honeycomb crush strength may be fine tuned through the change of the value of d between the welding spots and the distribution of the welding spots. To be specific, the smaller value of d indicates the smaller fluctuation of crush strength.

It can also be seen from above description that the crush strength of two columns of welding spots is larger than that of a single column of welding spots on the honeycomb node, that is, with the increase of the welding spots of the honeycomb arranged in the horizontal direction, the compression strength curve of the honeycomb becomes more stable, the fluctuation becomes smaller, and the design controllability is better.

It can be seen from above description that the present disclosure adopts laser perforation spot welding, and a design requirement for fine tuning the honeycomb crush strength and the honeycomb compression curve can be met by adjusting the value of d.

The above is only the preferred embodiments of the present disclosure and not intended to limit the present disclosure. For those skilled in the art, the present disclosure may have various modifications and changes. Any modifications, equivalent replacements, improvements and the like within the spirit and principle of the present disclosure should fall within the scope of protection of the present disclosure.

What is claimed is:

1. A honeycomb core material, wherein the honeycomb core material is formed by welding a plurality of honeycomb corrugated bands, and comprises a plurality of honeycomb elements and a plurality of honeycomb element nodes; each honeycomb corrugated band of the plurality of honeycomb corrugated bands comprises free edges and node edges that are continuously arranged, the node edges that are correspondingly welded together form a honeycomb element node of the plurality of honeycomb element nodes, and the plurality of honeycomb element nodes are welded by laser or resistance spot welding, wherein welding spots of the laser or resistance spot welding are uniformly distributed, a distance between two adjacent welding spots in a direction perpendicular to a cross section of the honeycomb elements is d, a side length at the honeycomb element node is A, and a value of d is less than or equal to a value of A, and the welding spots comprise a staggered distribution.

2. The honeycomb core material according to claim 1, wherein a node edge of the node edges that form the honeycomb element node of the plurality of honeycomb element nodes is provided with a concave-convex strip in the direction perpendicular to the cross section.

3. The honeycomb core material according to claim 2, wherein both the node edges that form the honeycomb element node of the plurality of honeycomb element nodes are provided with concave-convex strips in the direction perpendicular to the cross section, and the concave-convex strip of one of the node edges that form the honeycomb element node of the plurality of honeycomb element nodes fits with the concave-convex strip of a corresponding node edge that forms the honeycomb element node of the plurality of honeycomb element nodes; or one of the node edges that form the honeycomb element node of the plurality of honeycomb element nodes is provided with a concave-convex strip in the direction perpendicular to the cross section, and the other corresponding node edge welded together is not provided with a concave-convex strip.

4. The honeycomb core material according to claim 3, wherein the concave-convex strips are arranged on two edges of at least one honeycomb element node, a middle of the at least one honeycomb element node is a straight section, two edges are forward and reverse arc-shaped sections, and the welding spots are distributed on the straight section.

5. The honeycomb core material according to claim 3, wherein the concave-convex strips are arranged on two edges of at least one honeycomb element node, a middle is a straight section, two edges are forward and reverse arc-shaped sections, and the welding spots are distributed on the forward and reverse arc-shaped sections of the two edges; or the welding spots are distributed on the forward and reverse arc-shaped sections of the two edges and on the straight section.

6. The honeycomb core material according to claim 3, wherein the concave-convex strips are arranged on two edges of at least one honeycomb element node, a middle is a straight section, two edges are arc-shaped sections in a same direction, and the welding spots are distributed on the straight section.

7. The honeycomb core material according to claim 3, wherein the concave-convex strips are arranged on two edges of at least one honeycomb element node, a middle is a straight section, two edges are arc-shaped sections in a same direction, and the welding spots are distributed on the arc-shaped sections in a same direction of the two edges; or the welding spots are distributed on the arc-shaped sections in a same direction of the two edges and on the straight section.

8. The honeycomb core material according to claim 2, wherein the concave-convex strips are arranged on two edges of at least one honeycomb element node, a middle of the at least one honeycomb element node is a straight section, two edges are forward and reverse arc-shaped sections, and the welding spots are distributed on the straight section.

9. The honeycomb core material according to claim 2, wherein the concave-convex strips are arranged on two edges of at least one honeycomb element node, a middle is a straight section, two edges are forward and reverse arc-shaped sections, and the welding spots are distributed on the forward and reverse arc-shaped sections of the two edges; or the welding spots are distributed on the forward and reverse arc-shaped sections of the two edges and on the straight section.

10. The honeycomb core material according to claim 2, wherein the concave-convex strips are arranged on two edges of at least one honeycomb element node, a middle is a straight section, two edges are arc-shaped sections in a same direction, and the welding spots are distributed on the straight section.

11. The honeycomb core material according to claim 2, wherein the concave-convex strips are arranged on two edges of at least one honeycomb element node, a middle is a straight section, two edges are arc-shaped sections in a same direction, and the welding spots are distributed on the arc-shaped sections in a same direction of the two edges; or the welding spots are distributed on the arc-shaped sections in a same direction of the two edges and on the straight section.

12. The honeycomb core material according to claim 11, wherein during the laser or resistant spot welding a hole is formed in the middle of the welding spots, and a molten core is formed around the welding spots, or a fluctuation of a honeycomb crush curve and specific strength of the honeycomb core material are further controlled and adjusted by forming an opening on the honeycomb corrugated bands in advance by stamping, rolling or cutting.

13. The honeycomb core material according to claim 1, wherein there are two or more concave-convex strips on the honeycomb element node.

14. The honeycomb core material according to claim 1, wherein a material of the honeycomb core material is metal, and the metal comprises non-ferrous metal and ferrous metal; and the non-ferrous metal comprises a titanium alloy, aluminum or a magnesium alloy, and the ferrous metal comprises carbon steel, stainless steel or a superalloy.

* * * * *